(12) United States Patent
Fievez et al.

(10) Patent No.: US 9,175,664 B2
(45) Date of Patent: Nov. 3, 2015

(54) WAVE ENERGY CONVERSION

(75) Inventors: Jonathan Pierre Fievez, Melville (AU);
Greg John Allen, East Fremantle (AU);
Laurence Drew Mann, West Perth (AU)

(73) Assignee: CETO IP Pty Ltd., West Perth, Western Australia (AU)

( * ) Notice: Subject to any disclaimer, the term of this patent is extended or adjusted under 35 U.S.C. 154(b) by 297 days.

(21) Appl. No.: 13/817,136

(22) PCT Filed: Aug. 16, 2011

(86) PCT No.: PCT/AU2011/001045
§ 371 (c)(1),
(2), (4) Date: May 3, 2013

(87) PCT Pub. No.: WO2012/021926
PCT Pub. Date: Feb. 23, 2012

(65) Prior Publication Data
US 2013/0205769 A1    Aug. 15, 2013

(30) Foreign Application Priority Data

Aug. 16, 2010   (AU) ................................. 2010903672
Aug. 16, 2010   (AU) ................................. 2010903674

(51) Int. Cl.
*F16D 31/02*     (2006.01)
*F03C 1/00*      (2006.01)
(Continued)

(52) U.S. Cl.
CPC ............... *F03B 13/189* (2013.01); *B63B 22/00* (2013.01); *F03B 13/188* (2013.01);
(Continued)

(58) Field of Classification Search
CPC .. F03B 13/189; F03B 13/1885; F03B 13/188; F03B 13/1865; F03B 13/22; F04B 49/106; F04B 49/16; F04B 9/06; F04B 17/00; B63B 22/00; Y02E 10/38; F05B 2250/41; F05B 2220/62
USPC ......... 60/398, 495–507; 290/42, 53; 417/330, 417/331, 337
See application file for complete search history.

(56) References Cited

U.S. PATENT DOCUMENTS 3,677,001 A * 7/1972 Childers et al. ................. 60/398
3,818,523 A   6/1974 Stillman, Jr.
(Continued)

FOREIGN PATENT DOCUMENTS

EP   2 128 430   12/2009
GB   2475853     6/2011
(Continued)

OTHER PUBLICATIONS

International Search Report for International Application No. PCT/AU2011/001045 mailed Nov. 10, 2011.

*Primary Examiner* — Hoang Nguyen
(74) *Attorney, Agent, or Firm* — Merchant & Gould P.C.

(57) ABSTRACT

An apparatus is provided for harnessing ocean wave energy, wherein the apparatus relieves excessive loadings on components to avoid damage thereof in adverse wave conditions. The apparatus includes a buoyant actuator and a pump anchored within the body of water. Fluid at high pressure is pumped ashore by the pump, energy is extracted as useful work at an on-shore plant, and the resultant reduced pressure fluid is returned to the offshore pump to be re-energized. The buoyant actuator is operably connected to the pump by tether and is buoyantly suspended within the body of water above the pump. The buoyant actuator is provided with a connector that includes a damping mechanism configured to maintain a substantially rigid connection between the hollow body and the tether until such time as loading therebetween exceeds a prescribed load whereupon the damping mechanism facilitates limited relative movement therebetween to relieve the loading.

45 Claims, 15 Drawing Sheets

(51) Int. Cl.
*F03B 13/18* (2006.01)
*B63B 22/00* (2006.01)
*F03B 13/22* (2006.01)
*F04B 9/06* (2006.01)
*F04B 17/00* (2006.01)
*F04B 49/10* (2006.01)
*F04B 49/16* (2006.01)
*B63B 35/44* (2006.01)

(52) U.S. Cl.
CPC ........ *F03B 13/1865* (2013.01); *F03B 13/1885* (2013.01); *F03B 13/22* (2013.01); *F04B 9/06* (2013.01); *F04B 17/00* (2013.01); *F04B 49/106* (2013.01); *F04B 49/16* (2013.01); *B63B 2035/4466* (2013.01); *F05B 2220/62* (2013.01); *F05B 2250/41* (2013.01); *Y02E 10/38* (2013.01)

(56) References Cited

U.S. PATENT DOCUMENTS

| 4,249,084 | A | | 2/1981 | Villanueva et al. | |
|---|---|---|---|---|---|
| 4,421,461 | A | * | 12/1983 | Hicks et al. | 417/53 |
| 4,480,966 | A | * | 11/1984 | Smith | 417/332 |
| 4,754,157 | A | * | 6/1988 | Windle | 290/53 |
| 5,435,262 | A | | 7/1995 | Grinius et al. | |
| 6,702,557 | B2 | | 3/2004 | Kim et al. | |

FOREIGN PATENT DOCUMENTS

| JP | 2008-157642 | 7/2008 |
|---|---|---|
| WO | WO 2008/113128 | 9/2008 |
| WO | WO 2009/076712 | 6/2009 |
| WO | WO 2010/004293 | 1/2010 |

\* cited by examiner

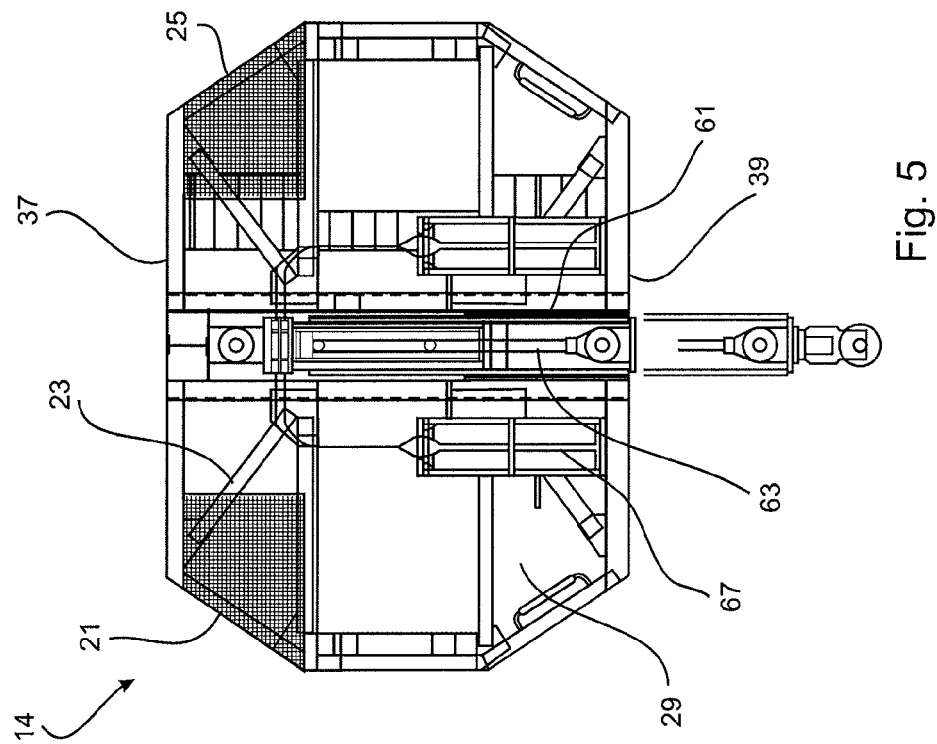
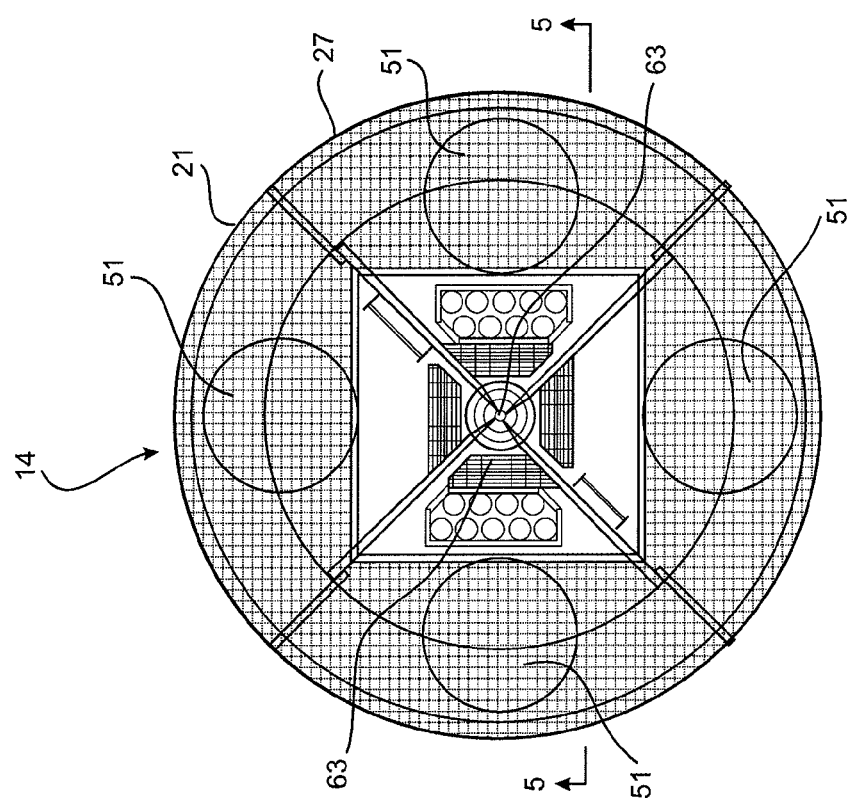

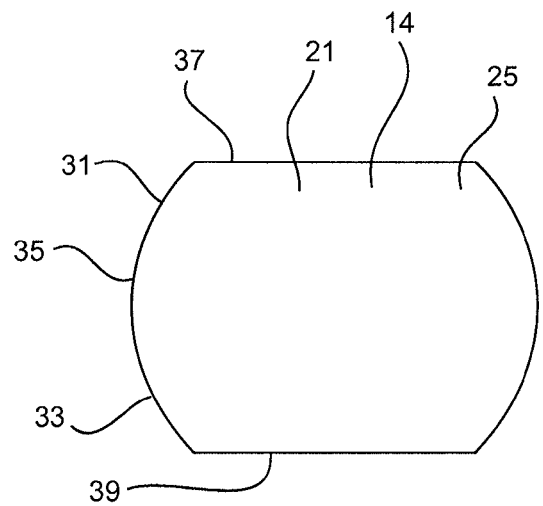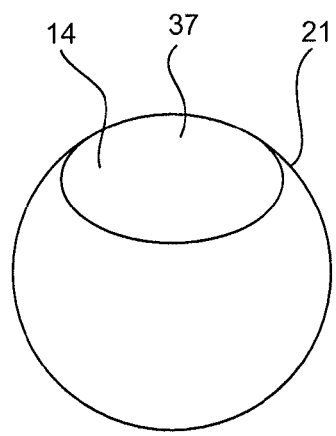
Fig. 18        Fig. 19
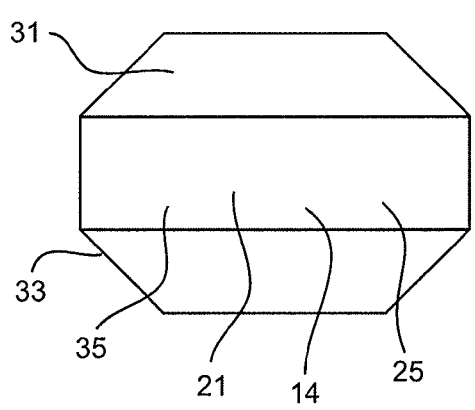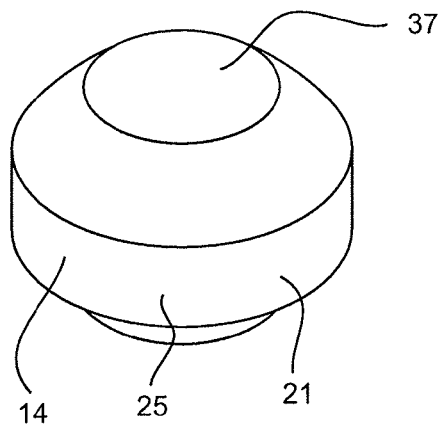
Fig. 20        Fig. 21

WAVE ENERGY CONVERSION

This application is a National Stage Application of PCT/AU2011/001045, filed 16 Aug. 2011, which claims benefit of Ser. No. 2010903672, filed 16 Aug. 2010 in Australia, and Ser. No. 2010903674, filed 16 Aug. 2010 in Australia; and which application(s) are incorporated herein by reference. To the extent appropriate, a claim of priority is made to each of the above disclosed applications.

FIELD OF THE INVENTION

This invention relates to wave energy conversion. In particular, the invention relates to apparatus for extracting energy from wave motion.

The invention also relates to a buoyant apparatus and to a wave energy conversion system incorporating such a buoyant apparatus.

In one arrangement, the buoyant apparatus may be configured as a buoyant actuator responsive to wave motion, and more particularly a buoyant actuator for coupling wave motion to a device operable in response to wave motion. In such an arrangement, the buoyant apparatus may be immersed in a body of water below the surface thereof. In another arrangement, the buoyant apparatus may be configured as a floating buoy.

The invention has been devised particularly, although not necessarily solely, as a buoyant actuator for harnessing wave energy and for converting the harnessed energy to linear motion for driving an energy conversion device such as a fluid pump or a linear electric generator. In such an arrangement, the buoyant actuator may be operably connected to the energy conversion device, with the buoyant actuator being buoyantly suspended within the body of water (but typically below the water surface). In this way, the buoyant actuator is, in effect, a submerged float which moves in response to wave action within the body of water.

The invention also relates to a wave energy conversion apparatus comprising a fluid pump adapted to undergo a pumping action in response to wave motion.

BACKGROUND ART

The following discussion of the background art is intended to facilitate an understanding of the present invention only. The discussion is not an acknowledgement or admission that any of the material referred to is or was part of the common general knowledge as at the priority date of the application.

It is known to couple wave motion to an energy conversion device operable in response to wave motion, one example of which is use of a buoyant actuator to translate wave motion into a reciprocating action at the energy conversion device.

When exposed to an aggressive sea state, typically adverse weather conditions (such as in storm conditions), buoyant actuators can be subject to extreme forces. Known buoyant actuators can be prone to damage or detachment when exposed to such conditions. Further, systems and components to which the buoyant actuators are coupled can be subjected to excessive loadings. In the case of a wave energy conversion system incorporating such a buoyant actuator, various components (such as the pump, the foundation to which the pump is anchored, and the coupling between the buoyant actuator and the pump) can be subjected to excessive loadings.

There have been various proposals for relieving excessive loadings on the foundations, pump and coupling components in a wave energy conversion system for the purpose of avoiding damage thereof in adverse sea conditions. One such proposal involves selectively opening the interior of the buoyant actuator to permit water to flow through the buoyant actuator in response to exposure of the buoyant actuator to adverse weather conditions. Because water can pass through the interior of the buoyant actuator there is a reduction in resistance to the moving water that impinges on the buoyant actuator. This removes much of the potential energy, as the buoyant actuator is not being heaved as much by the waves. Further, it also reduces the kinetic energy at the same time because the susceptible mass is reduced (as water is no longer trapped within the buoyant actuator) and the velocity is reduced (because the buoyant actuator is no longer providing such reaction to the wave forces that would cause it to accelerate). In this way loading on the pump and associated coupling (including the tether) can be attenuated to an acceptable level and achieve this in an acceptably short period of time It is against this background that the present invention has been developed.

DISCLOSURE OF THE INVENTION

According to a first aspect of the invention there is provided a buoyant apparatus comprising a hollow body presenting an exterior surface, the hollow body being adapted to be continuously located below a water surface during operation, a damping means associated with the hollow body for connecting the hollow body to a tether, the damping means providing a yieldingly resilient connection between the hollow body and the tether, the buoyant apparatus being operatively connectable to a separate pump by way of a coupling which includes the tether.

Preferably, the damping means is configured to maintain a substantially rigid connection between the body and the tether until such time as loading therebetween exceeds a prescribed load whereupon the damping means facilitates limited relative movement therebetween to relieve the loading.

Preferably, the damping means is accommodated within the hollow body.

Preferably, the damping means comprises a damping mechanism and an accumulator operably coupled to the damping mechanism through a resistance fluid.

Preferably, the damping mechanism comprises a body defining a cavity, a piston assembly accommodated within the cavity, the body and the piston assembly cooperating to define a working chamber in the cavity, the working chamber being of variable volume upon relative movement between the piston assembly and the body, wherein the accumulator is operably coupled to the working chamber through the resistance fluid.

The accumulator provides a predetermined fluid pressure loading on the piston assembly within the working chamber to resist movement of the piston assembly until such time as the load on the piston exceeds said prescribed load whereupon the piston assembly undergoes movement in response to the loading thereon causing progressive contraction of the working chamber to act upon the resistance fluid which yieldingly resists such movement.

The piston assembly may divide the cavity into a working side and a blind side, the working side defining the working chamber.

In one arrangement, the blind side may be closed. In another arrangement, a communication path may be provided between the working side and the blind side.

The piston assembly may comprise a piston head accommodated in the cavity and a piston rod extending from the cavity.

The body may comprise a cylinder barrel.

Preferably, the cylinder barrel is connected to the hollow body, and the piston rod is adapted for connection to the tether.

Preferably, the accumulator is accommodated within the hollow body.

Preferably, the cylinder barrel is mounted for pivotal movement about an axis transverse to the longitudinal axis of the buoyant apparatus.

Preferably, the hollow body is configured to provide an upper section, a lower section, and a mid section between the upper and lower sections.

Preferably, the upper and lower sections are of truncated configuration.

Preferably, the upper section presents an uppermost surface and the lower section presents a lowermost surface.

Preferably, holes are provided in the hollow body to permit entry of water into the hollow interior thereof.

Preferably, the holes are provided in the midsection.

The hollow body may be of any appropriate configuration. In one arrangement, the hollow body may be configured as a truncated sphere or a truncated, oblate spheroid. In another arrangement, the midsection of the hollow body may be cylindrical or polygonal.

The hollow body may be provided with one or more buoyancy chambers.

The buoyant chambers may be accommodated within the hollow body.

There may be provision for selectively varying the buoyancy of the hollow body. The selective variation of buoyancy may be achieved by introduction of a buoyancy controlling fluid into the buoyancy chambers or removal of a buoyancy controlling fluid from the buoyancy chambers.

The hollow body may comprise an internal frame structure supporting a surrounding skin which provides the exterior surface.

The cylinder barrel may be centrally located within the internal frame structure.

Preferably, the interior of the hollow body is accessible both on land and in the water for various operations, such a maintenance, and installation and removal of equipment.

In one arrangement, the damping means may provide the sole relief means for relieving excessive loadings on the tether.

In another arrangement, the buoyant apparatus may provide with additional relief means for relieving excessive loadings on the tether. The additional relief means may take any appropriate form; for example, the additional relief means may comprise means for selectively opening the interior of the buoyant apparatus to permit water to flow therethrough. Examples of such additional relief means comprise the arrangements disclosed in International Applications PCT/AU2008/001853 and PCT/AU2010/000398, the contents of which are incorporated herein by way of reference.

The system to which buoyant apparatus is connected through the tether may also incorporate relief means for relieving excessive loadings on the tether.

According to a second aspect of the invention there is provided a buoyant apparatus comprising a hollow body presenting an exterior surface, the hollow body being adapted to be continuously located below a water surface during operation, the hollow body being configured to provide an upper section, a lower section, and a mid section between the upper and lower sections, and further comprising holes in the hollow body to permit entry of water into the hollow interior thereof, wherein the holes are provided in the mid section.

Preferably, the upper and lower sections are of truncated configuration.

Preferably, the upper section presents an uppermost surface and the lower section presents a lowermost surface.

The buoyant apparatus according to any one of the preceding aspects of the invention may be configured as a buoyant actuator.

According to a third aspect of the invention there is provided a buoyant apparatus comprising a hollow body presenting an exterior surface, the hollow body being adapted to be continuously located below a water surface during operation, one or more buoyancy chambers accommodated within the hollow body, and means for selectively varying the buoyancy of the hollow body through a variation in a buoyancy controlling fluid within at least one of the buoyancy chambers.

According to a fourth aspect of the invention there is provided a wave energy conversion system comprising a buoyant apparatus according to any one of the preceding aspects of the invention.

According to a fifth aspect of the invention there is provided a wave energy conversion system comprising a buoyant apparatus comprising a hollow body presenting an exterior surface, the hollow body being adapted to be continuously located below a water surface during operation, one or more buoyancy chambers accommodated within the hollow body, and an opening means within the body permitting water to enter the hollow body, a pump operably connected to the buoyant apparatus to undergo a pumping action in response to wave motion, the pump being incorporated in a hydraulic circuit along which fluid is delivered by the pump, means associated with the hydraulic circuit for controlling characteristics of the fluid delivered by the pump, the pump having a first port and a second port, wherein the pump is configured to block communication between the second port and the working chamber as the working chamber approaches a minimum volume condition, whereby the rate at which the fluid can discharge from the contracting working chamber is restricted when the second port is blocked, thereby causing that portion of the fluid still remaining in the working chamber to be compressed at a far more rapid rate and so delivering far greater resistance to continued movement of the piston head.

Preferably, the hollow body comprises an upper section, a lower section, and a mid section between the upper and lower sections, the opening means comprising a plurality of apertures in the mid section.

The characteristics of the fluid being controlled may comprise the rate at which the fluid pressure increases during a delivery cycle of the pump.

The control of the rate at which the fluid pressure increases during a delivery cycle of the pump provides a system for relieving excessive loadings on the wave energy conversion apparatus. With this arrangement, energy can be released hydraulically from the wave energy conversion apparatus during operation thereof to avoid excessive loadings.

Preferably, the hydraulic circuit includes an accumulator. The accumulator may function to hydraulically resist the delivery cycle of the pump.

Preferably, the rate of hydraulic resistance to the delivery cycle of the pump increases progressively during the delivery cycle.

Some of the energy of the fluid delivered during a delivery cycle of the pump may be stored in the accumulator which functions to smooth the flow of the fluid.

Preferably, the pump comprises a reciprocating piston pump.

Preferably, the pump comprises a body defining a cavity, a piston assembly accommodated within the cavity, the body and the piston assembly cooperating to define a working chamber in the cavity, the working chamber being of variable volume upon relative movement between the piston assembly and the body, wherein the accumulator is operably coupled to the working chamber through the resistance fluid.

The piston assembly may divide the cavity into a working side and a blind side, the working side defining the working chamber.

The piston assembly may comprise a piston head accommodated in the cavity and a piston rod extending from the cavity.

The body may comprise a cylinder barrel.

Preferably, the cylinder barrel is connected to a mooring such as a base installed on the floor of a body of water, and the piston rod is adapted for connection to the tether.

Preferably, the second port communicates with a fluid flow path.

Preferably, the cavity is configured to comprise a first cavity section of larger diameter and a second cavity section of smaller diameter, with a shoulder defined therebetween, the first cavity section accommodating the piston head and the second cavity section being incorporated in the working chamber.

Preferably, the second cavity section has a side wall onto which the second port opens and the shoulder defines an annular face which confronts the first cavity section and onto which the first port opens for communication with the first cavity section.

Preferably, the second cavity section is of a size which can accommodate the piston rod but not the piston head, the piston rod extends from the piston head, passing through the second cavity section.

Preferably, the piston rod incorporates an obscuring sleeve which is disposed adjacent to the piston head and which is configured to enter the second cavity section as the working chamber approaches its minimum volume condition, wherein upon the sleeve entering the second cavity section it cooperates with the side wall of the second cavity section and obscures the second port from the first cavity section. This effectively restricts communication between the working chamber and the accumulator to be by way of the first port.

According to a seventh aspect of the invention there is provided a wave energy conversion apparatus comprising a buoyant apparatus adapted to be continuously located below a water surface during operation and a pump adapted to undergo a pumping action in response to wave motion, the pump being incorporated in a hydraulic circuit along which fluid is delivered by the pump, and means associated with the hydraulic circuit for controlling characteristics of the fluid delivered by the pump.

According to an eighth aspect of the invention there is provided a pump comprising a body defining a cavity, a piston assembly accommodated within the cavity, the body and the piston assembly cooperating to define a working chamber in the cavity, the working chamber being of variable volume upon relative movement between the piston assembly and the body, the piston assembly dividing the cavity into a working side defining the working chamber, a first port for communication with an accumulator and second port for communication with a fluid flow path for fluid intake upon volume expansion of the working chamber and fluid delivery upon volume contraction of the working chamber, wherein the pump is configured to block communication between the second port and the working chamber as the working chamber approaches a minimum volume condition.

Preferably, the pump is configured to block communication between the second port and the working chamber as the working chamber approaches a minimum volume condition by virtue of the configuration of the piston assembly.

Preferably, the piston assembly comprises an obscuring sleeve for blocking communication between the second port and the working chamber as the working chamber approaches said minimum volume condition.

The pump according to the seventh aspect of the invention may incorporate any one or more of the features referred to above in relation to the pump within the wave energy conversion system according to the fifth aspect of the invention.

According to an eighth aspect of the invention there is provided a wave energy conversion system comprising a pump according to the seventh aspect of the invention.

BRIEF DESCRIPTION OF THE DRAWINGS

The invention will be better understood by reference to the following description of several specific embodiments thereof as shown in the accompanying drawings in which:—

FIG. 4 is a further plan view of the buoyant actuator, with parts removed to reveal internal features;

FIG. 5 is a section along line 5-5 of FIG. 4;

FIG. 18 is a schematic side view of a buoyant actuator incorporated in apparatus for harnessing ocean wave energy according to a fifth embodiment;

FIG. 19 is a schematic perspective view of the buoyant actuator as shown in FIG. 18;

FIG. 20 is a schematic side view of a buoyant actuator incorporated in apparatus for harnessing ocean wave energy according to a sixth embodiment; and FIG. 21 is a perspective view of the buoyant actuator shown in FIG. 20.

BEST MODE(S) FOR CARRYING OUT THE INVENTION

Figure 1:
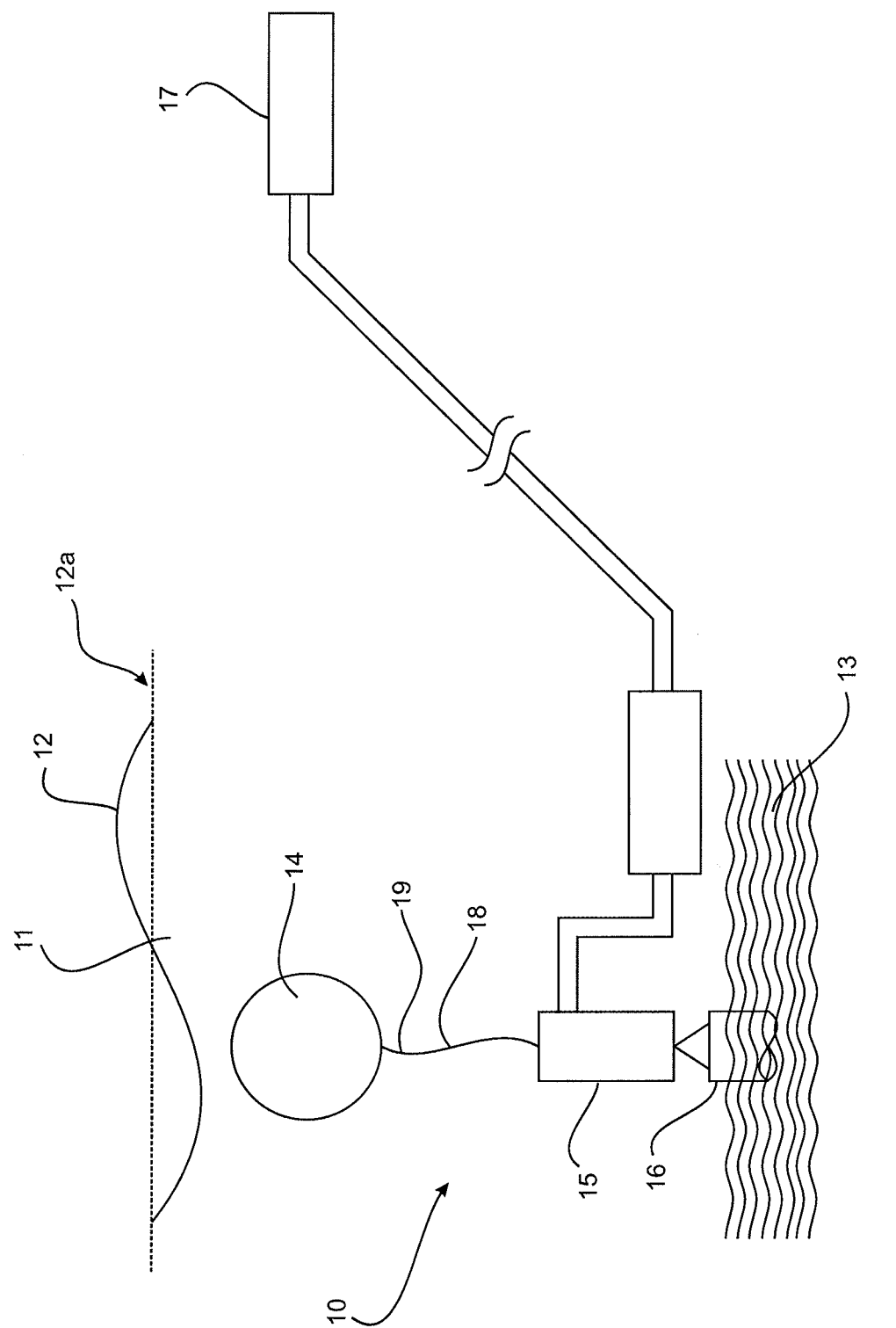
FIG. 1 is a schematic view of apparatus for harnessing ocean wave energy according to a first embodiment.
Figure 3:
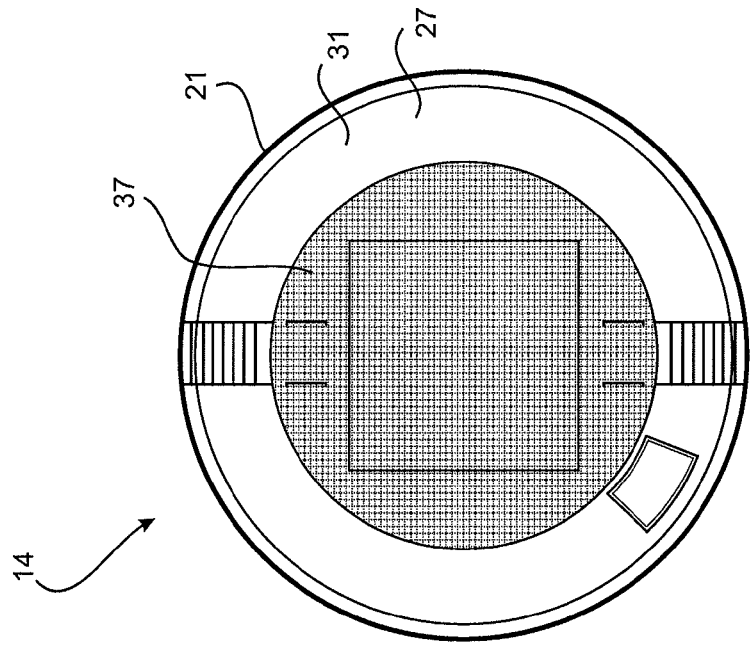
FIG. 3 is a plan view of the buoyant actuator shown in FIG. 2.
Figure 2:
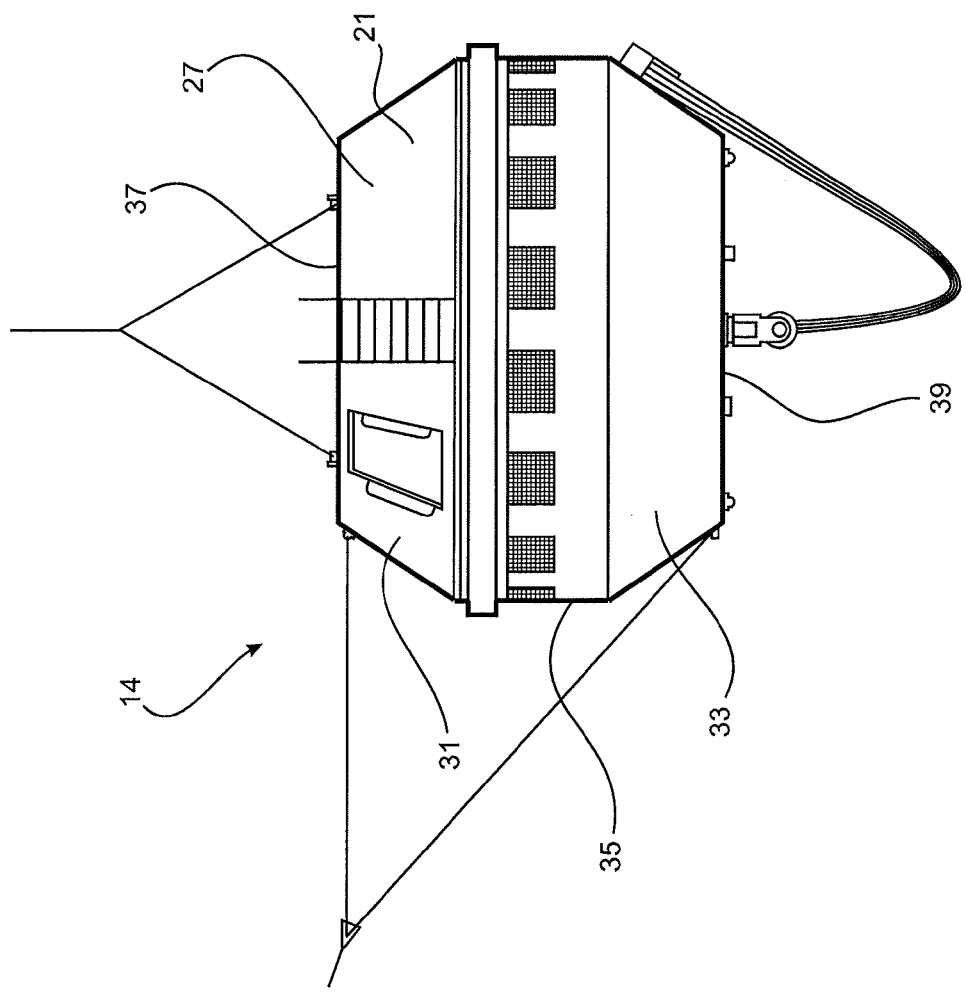
FIG. 2 is a schematic side view of a buoyant actuator incorporated in the apparatus according to the first embodiment.
Figure 6:
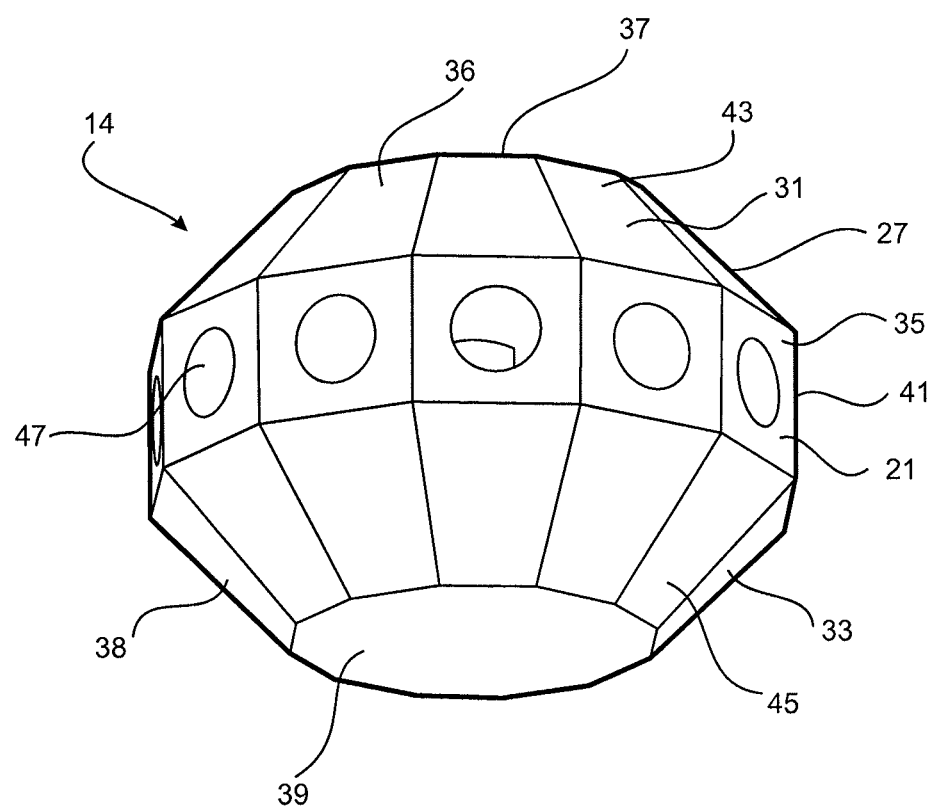
FIG. 6 is schematic perspective view depicting the configuration of the exterior skin of the buoyant actuator.
Figure 7:
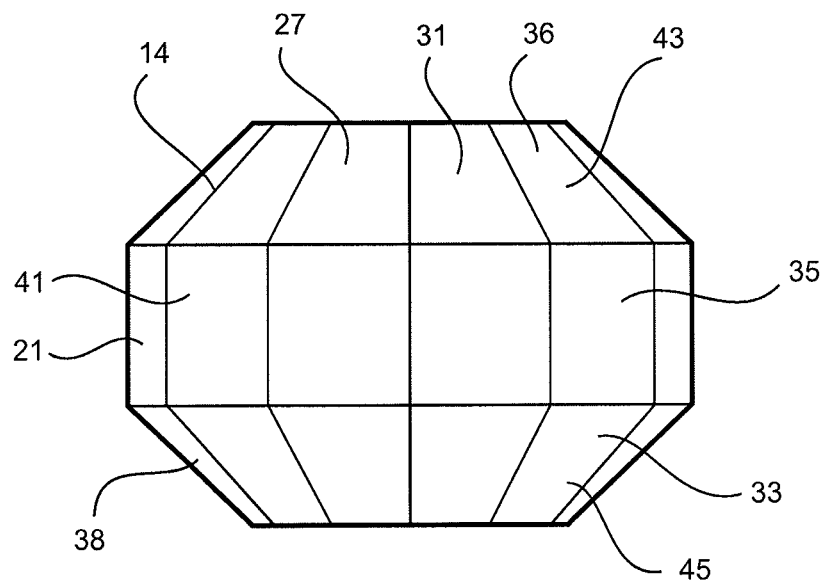
FIG. 7 is a view similar to FIG. 6 depicting exterior configuration of the buoyant actuator.
Figure 8:
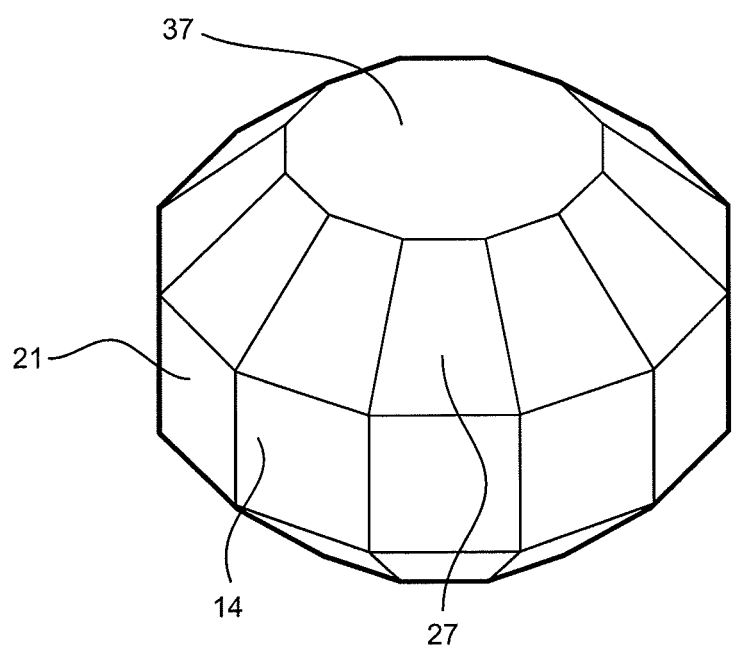
FIG. 8 is a further perspective view depicting the exterior configuration of the buoyant actuator.
Figure 9:
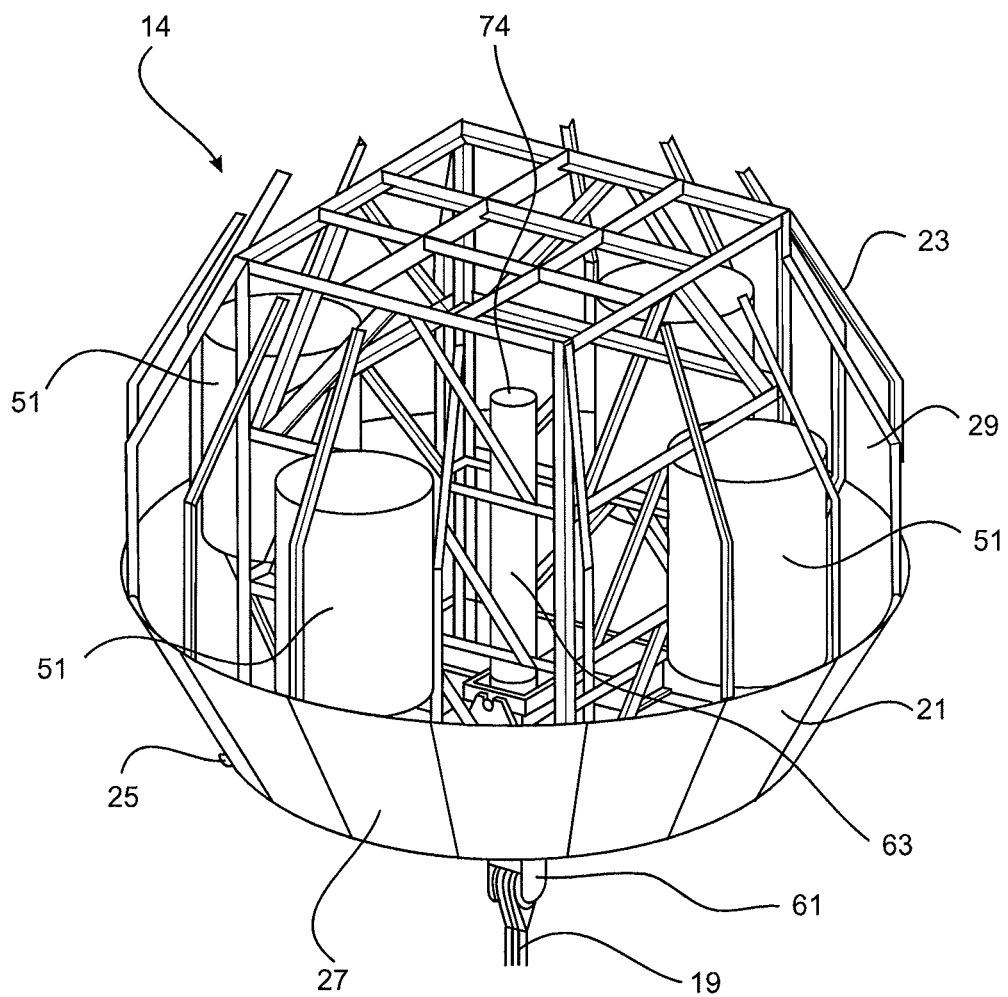
FIG. 9 is a schematic perspective view of the buoyant actuator, with part of the exterior skin removed to reveal internal features.
Figure 10:
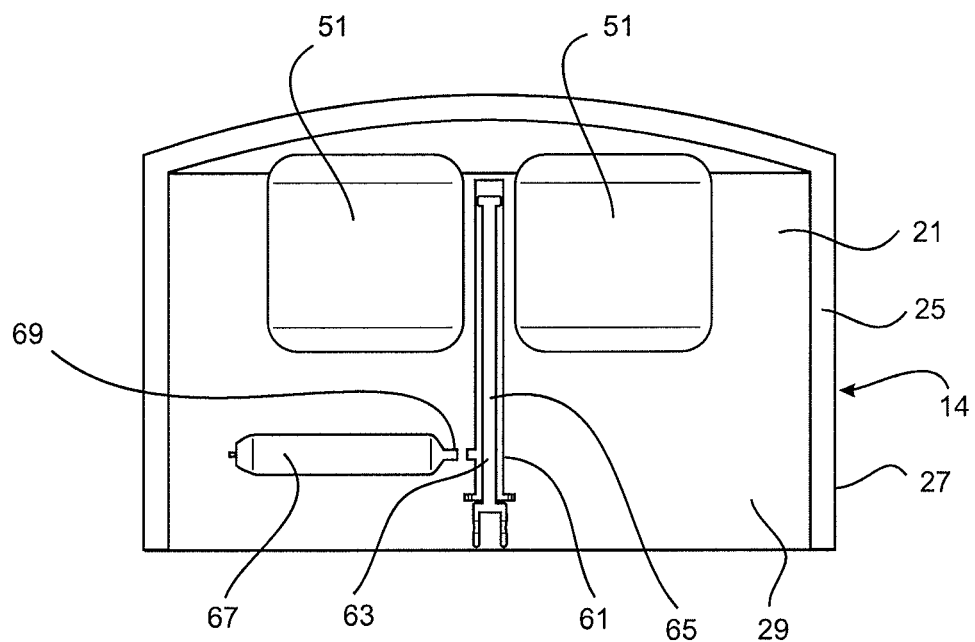
FIG. 10 is a schematic sectional view of the buoyant actuator depicting a damping means accommodated within the interior of the buoyant actuator.
Figure 11:
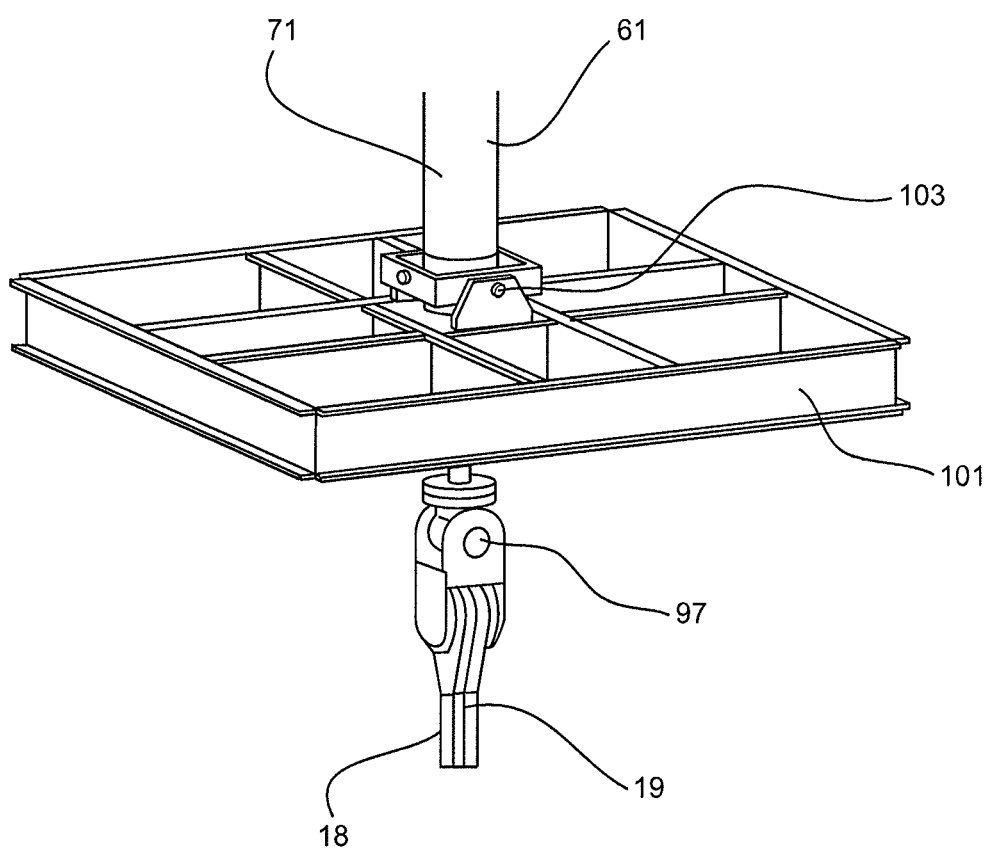
FIG. 11 is a schematic perspective view of part of the buoyant actuator.
Figure 12:
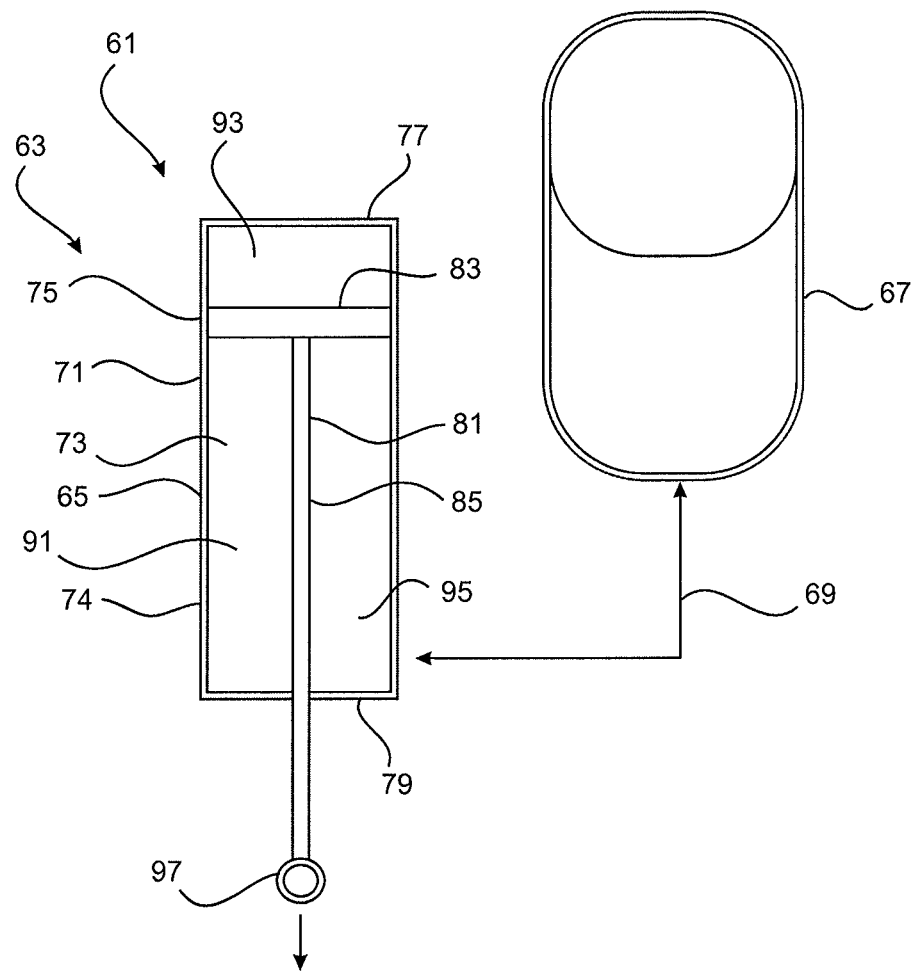
FIG. 12 is a schematic depicting of the damping means, illustrating in particular a damping mechanism and an accumulator.

The embodiments shown in the drawings are each directed apparatus 10 for harnessing ocean wave energy.

Referring to FIG. 1, the apparatus 10 is installed offshore in a body of water 11 having a water surface 12 and a seabed 13. The apparatus 10 includes a buoyant actuator 14, and a pump 15 anchored to a mooring 16 which, in the arrangement illustrated, comprises a base installed on the seabed 13. The pump 15 is secured to the mooring 16 such that the pump is able to pivot relative to the mooring.

The apparatus 10 is designed to operate in a closed-loop mode wherein fluid at high pressure is pumped ashore by the pump 15, energy is extracted as useful work at an on-shore plant 17, and the resultant reduced pressure fluid is returned to the offshore pump 15 to be re-energised.

The buoyant actuator 14 is operably connected to the pump 15 and is buoyantly suspended within the body of water 11 above the pump 15 but below the water surface 12 at a depth such that its upper surface is typically a few metres below the mean sea level 12a.

The buoyant actuator 14 is operatively connected to the pump 15 by way of a coupling 18 which includes a tether 19.

Referring now to FIGS. 2 to 12, the buoyant actuator 14 incorporated in apparatus 10 according to the first embodiment comprises a hollow body 21 having an internal frame structure 23 supporting a surrounding skin 25 which provides the exterior surface 27. The hollow body 21 defines an interior 29 in which the internal frame structure 23 is accommodated. The interior 29 of the hollow body 21 is accessible both on land and in the water for various operations, such a maintenance, and installation and removal of equipment. Various fittings may be provided on the hollow body 21 to facilitate lifting and deployment thereof. Typically, such fittings would be anchored to the internal frame structure 29.

The hollow body 21 is configured to provide an upper section 31, a lower section 33, and a mid section 35 between the upper and lower sections 31, 33.

The upper section 31 is of truncated configuration and comprises a tapered upper side portion 36 and an uppermost surface 37. The lower section 33 is of truncated configuration and comprises a tapered side portion 38 and a lowermost surface 39. The uppermost and lowermost surfaces 37, 39 are flat and closed. This configuration is particularly advantageous for the lowermost surface in order to optimise coupling to the heaving motion of the water waves.

The hollow body 21 has a central longitudinal axis (not shown) extending therethrough between the uppermost surface 37 and the lowermost surface 39.

In the arrangement shown, the mid section 35 is of polygonal configuration presenting a plurality of facets 41. The upper and lower sections 31, 33 are correspondingly configured such that the tapered upper side portion 36 presents a plurality of upper facets 43 and the tapered lower side portion 38 presents a plurality of lower facets 45.

The hollow body 21 is configured to permit entry of water into the hollow interior 29 thereof through the provision of portholes 47 in the skin 25. In this embodiment, the portholes 47 are provided in the mid section 35, typically at least one in each of the facets 41. The portholes 47 permit water to flow into and out of the interior 29 of the hollow body 21, thereby reducing the influence of side flow of water on the buoyant actuator 10. In particular, the portholes 47 are of a size to allow the interior 29 of the hollow body 21 to fill with water and to also allow a slight luffing of water into and out of the interior 29 when the buoyant actuator 14 moves horizontally. This small water flow may be sufficient to reduce the lateral loading on the buoyant actuator 14 and hence limit the lateral motion. It is desirable to limit the lateral motion in order to limit lateral loading on the coupling 18, the pump 15 and the mooring 16. With this arrangement, lateral motion to which the buoyant actuator 14 is susceptible can be controlled to some extent by appropriate selection of the size of the portholes 47.

Buoyancy chambers 51 are accommodated within the interior 29 of the hollow body 21 to provide buoyancy to the buoyancy actuator 10. In the arrangement shown, there are four buoyancy chambers 51 disposed about the central longitudinal axis of the hollow body 21 in equally spaced relation. There is provision for selectively varying the buoyancy of the buoyant actuator 14 through selective introduction of a buoyancy controlling fluid into the buoyancy chambers or removal of a buoyancy controlling fluid from the buoyancy chambers.

The buoyant actuator 14 is provided with a connection means 61 adapted to provide a yieldingly resilient connection between the hollow body 21 and the tether 19.

The connection means 61 comprises a damping means 63 configured to maintain a substantially rigid connection between the hollow body 21 and the tether 19 until such time as loading therebetween exceeds a prescribed load whereupon the damping means 63 facilitates limited relative movement therebetween to relieve the loading. By way of example only, the damping means 63 may be configured to limit the maximum tether tension load to say 140 tonnes and to commence to operate once the tether tension load reaches say 100 tonnes. In this example, the damping means 63 would not operate when the tether tension load is below 100 tonnes, in which case there would effectively be a rigid connection between the hollow body 21 and the tether 19. Once the tether tension load reaches 100 tonnes, the damping means 63 would commence to operate and would yieldingly resist the tether load, limiting it to the maximum of 140 tonnes. The damping means 63 can, of course, be configured to operate within any selected range of tether loads, and the foregoing example was provided merely for the purpose of explanation.

The damping means 63 is accommodated within the interior 29 of the hollow body 21 and comprises a hydraulic damping mechanism 65 and a hydraulic accumulator 67. The damping mechanism 65 and the accumulator 67 are interconnected through a resistance fluid which can pass through a flow line 69 extending therebetween. In this embodiment, the resistance fluid comprises an elastically compressible fluid such as air or a dry gas.

The damping mechanism 65 comprises a body 71 defining a cavity 73. In the arrangement illustrated, the body 71 is configured as a cylinder barrel 74 having a side wall 75, and two opposed end walls 77, 79. A piston assembly 81 is accommodated within the cavity 73. The piston assembly 81 comprises a piston head 83 and a piston rod 85.

The piston head 83 is slidably and sealingly located in the cavity 73 to divide the cavity into a working side 91 and a blind side 93. The working side 91 defines a working chamber 95 in the cavity 73, the working chamber 95 being of variable volume upon relative movement between the piston assembly 81 and the cylinder barrel 74. The blind side 93 of the damping mechanism 65 is closed.

The piston rod 85 extends from the cavity 73 through end wall 79.

The cylinder barrel 74 is connected to the hollow body 21, and the piston rod 85 is adapted for connection to the tether 19. More particularly, the cylinder barrel 74 is centrally located within the hollow body 21 in alignment with its central longitudinal axis and the outer end of the piston rod 85 is configured to provide an attachment point 97 for the tether 19. The piston rod 85 extends downwardly beyond the lowermost surface 39 of the skin 25 of the hollow body 21 for connection to the tether 19.

The accumulator 67 may be of any appropriate type, such as a nitrogen-charged piston accumulator.

The accumulator 67 is pre-charged to provide a predetermined fluid pressure loading on the piston assembly 81 within the working chamber 95 to resist movement of the piston assembly until such time as the load on the piston rod 85 as transmitted by the tether 19 exceeds said prescribed load, whereupon the piston assembly 81 undergoes movement in response to the loading on the piston rod 85, causing progressive contraction of the working chamber 95 to act upon the resistance fluid which yieldingly resists such movement. As the working chamber 95 progressively contracts, it progressively further pressurises the resistance fluid communicating with the accumulator 67. This serves to relieve the tension loading between the buoyant actuator 14 and the tether 19, and provides time for the buoyant actuator 14 to decelerate in a controlled manner. As the tension loading subsides, the fluid pressure delivered by the accumulator 67 reasserts its influence and causes the piston assembly to undergo return movement.

The cylinder barrel 74 is supported on a base 101 which forms part of the internal frame structure 23 through hinge 103 for pivotal movement about an axis transverse to the central longitudinal axis of the hollow body 21. The pivotal mounting arrangement allows the hollow body 21 to tilt while maintaining alignment between the damping mechanism 65 and the tether 19.

Figure 13:
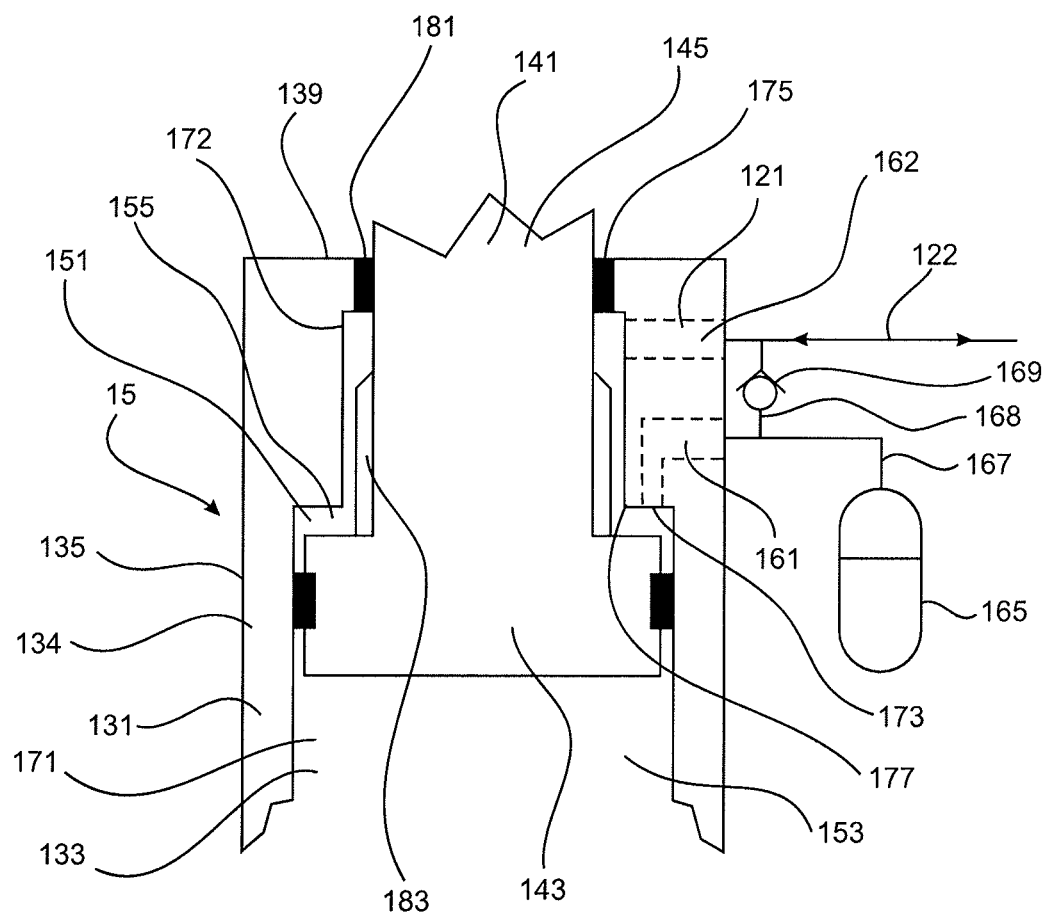
FIG. 13 is a schematic fragmentary view of a pump forming part of the apparatus according to the first embodiment.
Figure 14:
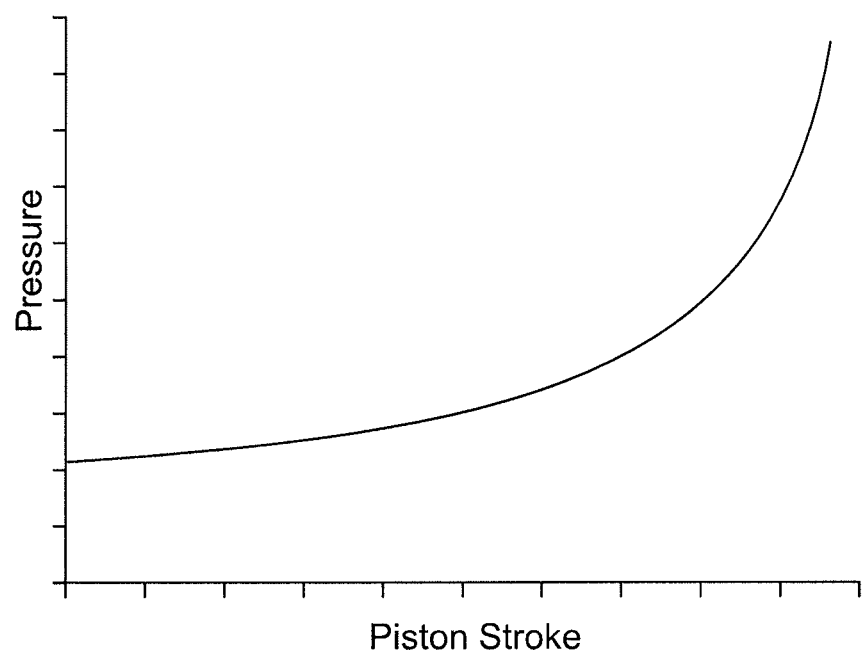
FIG. 14 is a graphical depiction of pressure rise within the pump during a delivery stroke thereof.

Referring now to FIGS. 13 and 14, the pump 15 has an outlet 121 connected to the onshore plant 17 by a flow line 122 in communication with a high pressure delivery pipeline and a low pressure return line. The high pressure delivery pipeline and the low pressure return line each communicate with the outlet 121, with low pressure fluid being inducted upon an intake stoke of the pump and high pressure fluid being expelled upon a delivery stroke of the pump.

The pump 15 comprises a body 131 defining a cavity 133. In the arrangement illustrated, the body 131 is configured as a cylinder barrel 134 having a side wall 135, and two opposed end walls, only one 139 of which is shown. A piston assembly 141 is accommodated within the cavity 133. The piston assembly 141 comprises a piston head 143 and a piston rod 145.

The piston head 143 is slidably and sealingly located in the cavity 133 to divide the cavity into a working side 151 and a blind side 153. The working side 151 defines a working chamber 155 in the cavity 133, the working chamber 155 being of variable volume upon relative movement between the piston assembly 141 and the cylinder barrel 134. The blind side 153 of the pump 15 is closed.

The cylinder barrel 134 is connected to the mooring 16, and the piston rod 145 is adapted for connection to the tether 19.

The pump 15 has a first port 161 and a second port 162, each communicating with the cavity 133. The first port 161 communicates with an accumulator 165 through accumulator flow line 167. The second port 162 provides the outlet 121.

The accumulator 165 may be of any appropriate type, such as a nitrogen-charged piston accumulator.

The accumulator flow line 167 communicates with the flow line 122 through by-pass line 168 incorporating a one-way valve 169.

The cavity 133 is configured to comprise a first cavity section 171 of larger diameter and a second cavity section 172 of smaller diameter, with a shoulder 173 defined therebetween. The first cavity section 171 accommodates the piston head 143 and the second cavity section 172 is incorporated in the working chamber 155.

The second cavity section 172 has a side wall 175 onto which the second port 162 opens.

The shoulder 173 defines an annular face 177 which confronts the first cavity section 171 and onto which the first port 161 opens for communication with the first cavity section.

The second cavity section 172 is of a size which can accommodate the piston rod 145 but not the piston head 143. The piston rod 145 extends from the piston head 143, passing through second cavity section 172. The piston rod 145 extends from the cavity 133 through an opening in end wall 139, with a fluid seal 181 between the piston rod and the end wall.

The piston rod 145 incorporates an obscuring sleeve 183 which is disposed adjacent the piston head 143 and which is configured to enter the second cavity section 172 as the working chamber 155 approaches its minimum volume condition. When the sleeve 183 enters the second cavity section 172 it cooperates with the side wall 175 of the second cavity section and obscures the second port 162 from the first cavity section 155, as depicted in FIG. 13. This effectively restricts communication between the working chamber 155 and the flow line 122. Fluid retained in the working chamber 155 communicates with the accumulator 165 through the first port 161 which remains exposed to the working chamber 155. The pressure of the retained fluid rises dramatically, as depicted graphically in FIG. 14. This provides a cushioning effect on the piston assembly 141, dissipating energy and damping motion of the buoyant apparatus 11.

The flow of fluid through port 162 to the flow line 122 and the flow of fluid through port 161 to the accumulator 165 cooperate to define a pressure-stroke characteristic for the damping mechanism. This characteristic may be adapted to suit any particular damping situation by varying one or more of the design parameters such as the volume of the second cavity section 172.

It is a feature of the foregoing arrangement that the control of the pump 15 for dissipation of energy for damping purposes is effectively co-located with the pump, thereby enhancing its effectiveness.

Figure 15:
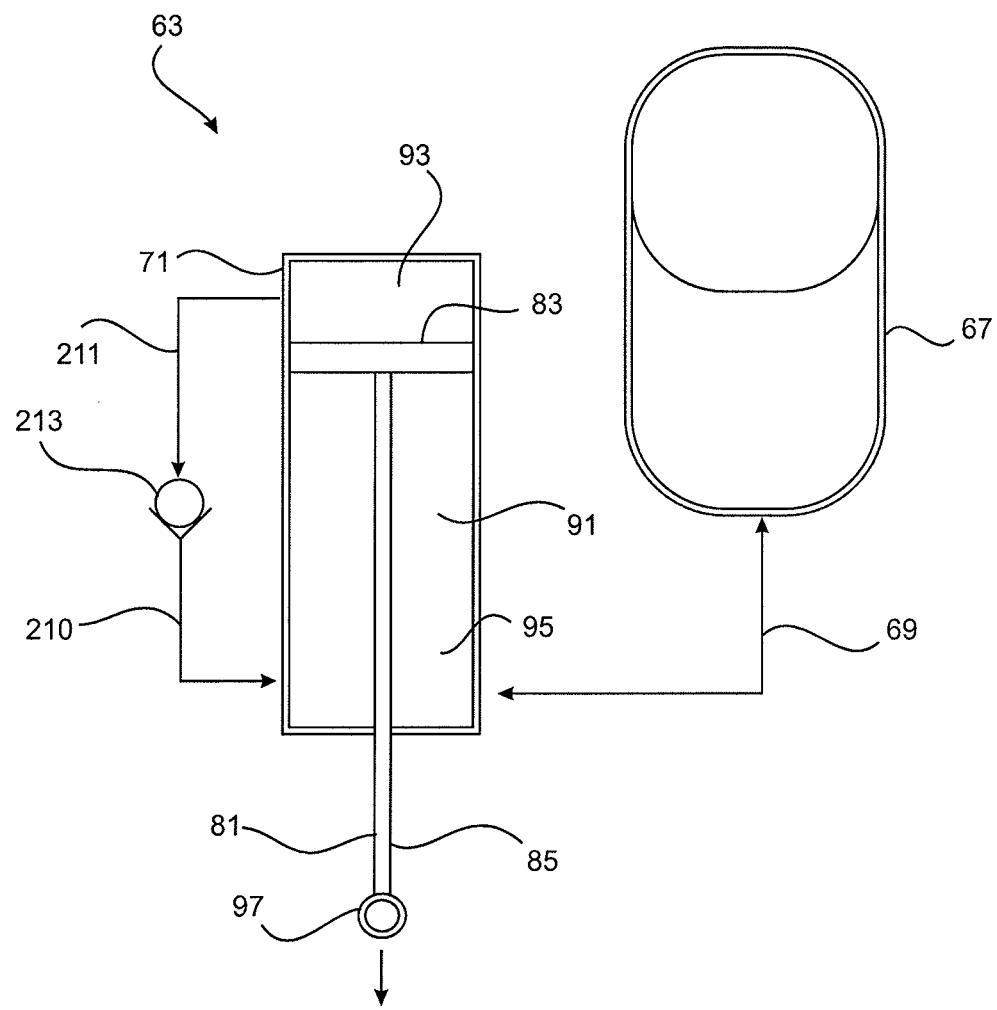
FIG. 15 is a schematic view depicting a damping means for a buoyant actuator incorporated in apparatus for harnessing ocean wave energy according to a second embodiment.

Referring now to FIG. 15, there is shown a damping means 63 for a buoyant actuator incorporated in apparatus 10 according to a second embodiment. The damping means 63 for a buoyant actuator in apparatus 10 according to the second embodiment is similar to that of the first embodiment and so like reference numerals are used to identify like parts. The damping mechanism 65 in this embodiment differs from that in the first embodiment in that the blind side 93 is not closed. Rather, the blind side 93 communicates with the working side 91 through a by-pass passage 210 defined by by-pass line 211 incorporating a valve 213. The valve 213 allows fluid that may have leaked past the seals around piston head 83 and into the blind side 93 to return to the working chamber 95.

Figure 16:
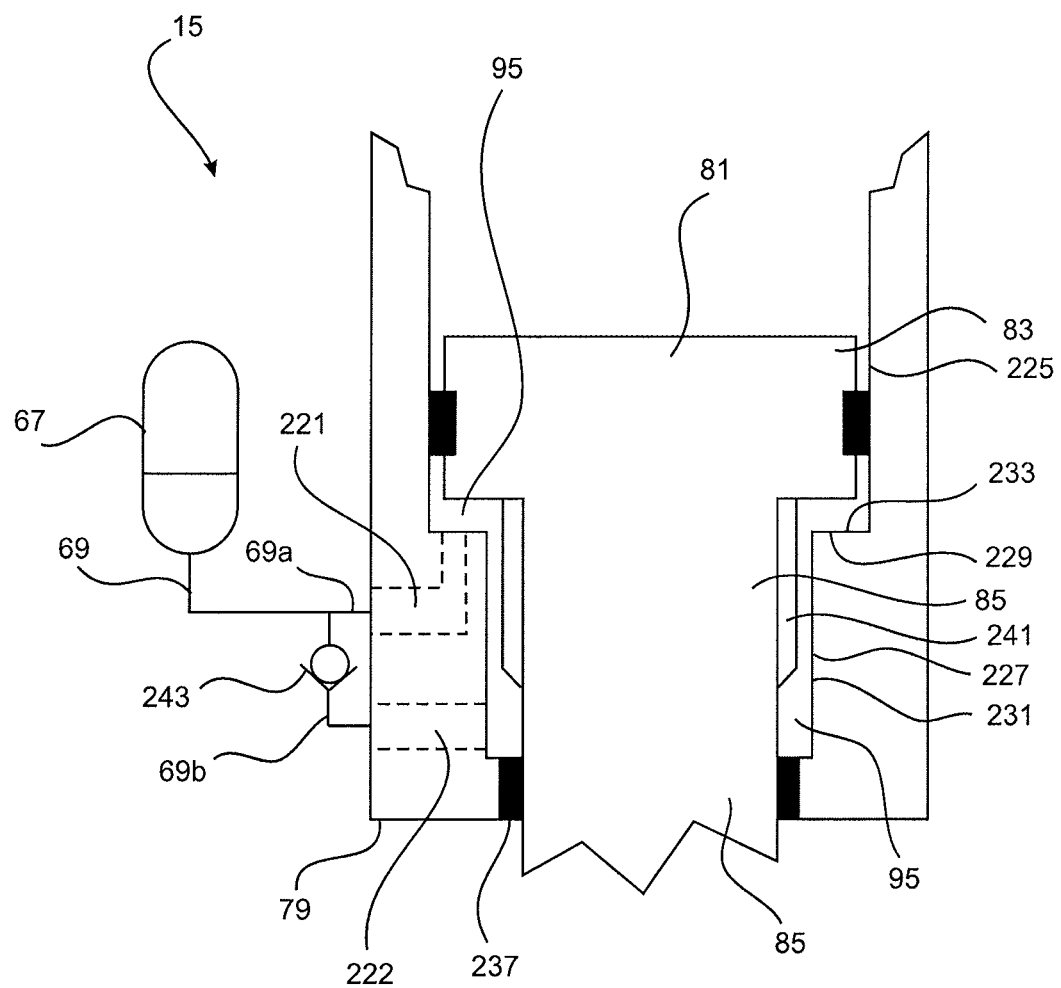
FIG. 16 is a fragmentary schematic view of a damping means for a buoyant actuator incorporated in apparatus for harnessing ocean wave energy according to a third embodiment.

Referring now to FIG. 16, there is shown a hydraulic damping means 63 for a buoyant actuator incorporated in apparatus 10 according to a third embodiment. The hydraulic damping means 63 for the buoyant actuator in apparatus 10 according to the third embodiment is similar to that of the first embodiment and so like reference numerals are used to identify like parts. In the damping mechanism 63 illustrated in FIG. 16, the hydraulic accumulator 67 communicates with the working chamber 95 within the damping mechanism 65 through a first port 221 and a second port 222.

The damping mechanism 63 is configured to block communication between the second port 222 and the working chamber 95 as the working chamber approaches a minimum volume condition. When the second port 222 is blocked, the rate at which the resistance fluid can discharge from the contracting working chamber 95 is restricted, thereby causing that portion of the resistance fluid still remaining in the working chamber to be compressed at a far more rapid rate and so delivering far greater resistance to continued movement of the piston head 83.

The cavity 73 is configured to comprise a first cavity section 225 of larger diameter and a second cavity section 227 of smaller diameter, with a shoulder 229 defined therebetween. The first cavity section 225 accommodates the piston head 83 and the second cavity section 227 is incorporated in the working chamber 95.

The second cavity section 227 has a side wall 231 onto which the second port 222 opens.

The shoulder 229 defines an annular face 233 which confronts the first cavity section 225 and onto which the first port 221 opens for communication with the first cavity section.

The second cavity section 227 is of a size which can accommodate the piston rod 85 but not the piston head 83. The piston rod 85 extends from the piston head 83, passing through second cavity section 227. The piston rod 85 extends from the cavity 73 through an opening in end wall 79, with a fluid seal 237 between the piston rod and the end wall.

The piston rod 85 incorporates an obscuring sleeve 241 which is disposed adjacent the piston head 83 and which is configured to enter the second cavity section 227 as the working chamber 95 approaches its minimum volume condition. When the sleeve 241 enters the second cavity section 227 it cooperates with the side wall 231 of the second cavity section 227 and obscures the second port 222 from the first cavity section 225, as depicted in FIG. 16. This effectively restricts communication between the working chamber 95 and the accumulator 61 to be by way of the first port 221 which opens onto the first cavity section 225 and so is not obscured.

The flow line 69 between the accumulator 67 and the damping mechanism 65 branches into first and second flow line sections 69a, 69b. First flow line section 69a communicates with the first port 121 and second flow line section 69b communicates with the second port 122. The second flow line section 69b incorporates a one-way valve 243 adapted to allow flow from the second port 222 to the accumulator 67 while preventing flow in the opposite direction.

The flow of fluid through ports 221 and 222 to the accumulator 67 cooperate to define a pressure-stroke characteristic for the damping mechanism. This characteristic may be adapted to suit any particular damping situation by varying the amount of restriction between the chamber 95 and the accumulator 67.

In the previous embodiments, the hydraulic damping means 63 associated with the buoyant actuator 14, and the control of the pump 15 for dissipation of energy for damping purposes, each provide a relief arrangement for relieving excessive loadings on the tether 19. This is advantageous as it offers redundancy in the relief of excessive loadings.

In other embodiments, the relief may be provided solely by hydraulic damping associated with the buoyant actuator 14 (through incorporation of hydraulic damping means 63); that is, there may be no provision for control of the pump 15 for dissipation of energy for damping purposes.

In still other embodiments, the relief may be provided solely through control of the pump 15 for dissipation of energy for damping purposes; that is, there may be no provision for hydraulic damping associated with the buoyant actuator.

Figure 17:
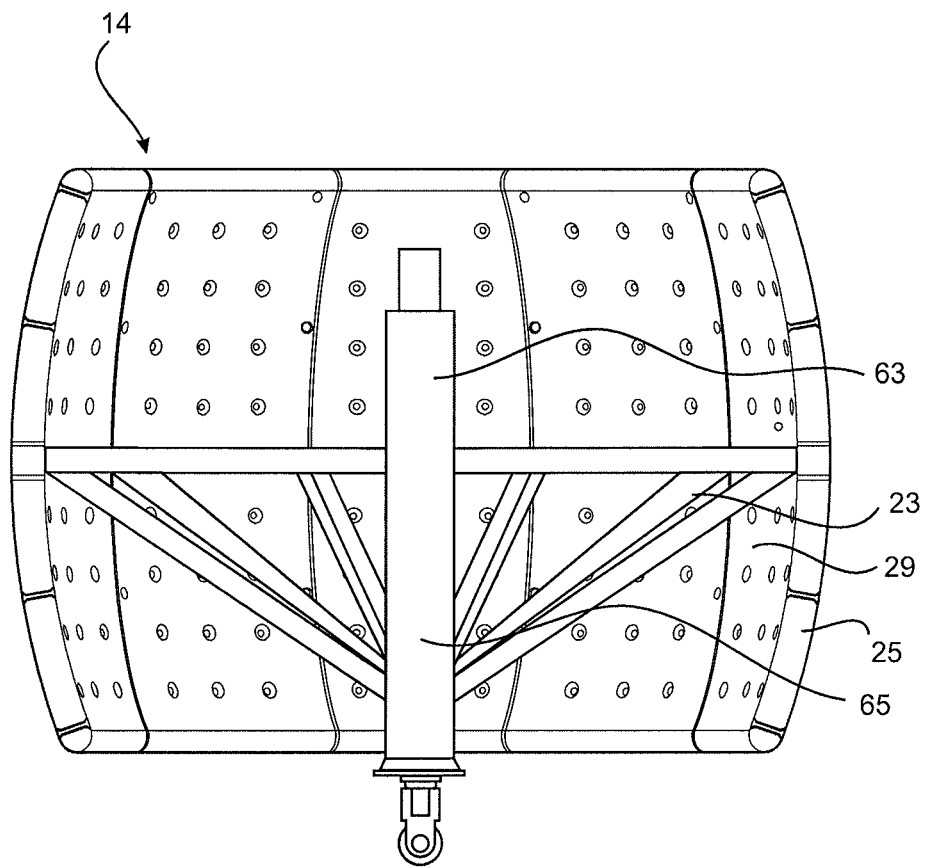
FIG. 17 is a schematic sectional side view of a buoyant actuator incorporated in apparatus for harnessing ocean wave energy according to a fourth embodiment.

Referring now to FIG. 17, there is shown a buoyant actuator 14 which incorporates the damping means 63. The damping means 63 for a buoyant actuator 14 is similar to that of the first embodiment and so like reference numerals are used to identify like parts. In particular the damping means 63 is accommodated within the interior 29 of the hollow body 21 as was the case with previous embodiments and comprises the hydraulic damping mechanism 65 and the hydraulic accumulator (not shown).

In this arrangement, the hollow body 21 is configured in a manner allowing selectively opening the interior of the buoyant actuator 14 to permit additional water to flow through the buoyant actuator in response to exposure of the buoyant actuator to adverse weather conditions. Because additional water can pass through the interior of the buoyant actuator there is a further reduction in resistance to the moving water that impinges on the buoyant actuator and thus further relief in response to excessive loadings. In this embodiment, the hollow body 21 incorporates features of the buoyant actuator described and illustrated in PCT/AU2010/000398 for the purposes of delivering the additional relief.

The buoyant actuator 14 can be configured such that the additional damping means offers either the primary or secondary relief system.

Referring now to FIGS. 18 to 21, there are shown various configurations of the hollow body 21 which can be utilised, as appropriate, in relation to buoyant actuators 14 in apparatus 10 according to the invention.

It should be appreciated that the scope of the invention is not limited to the scope of the embodiments described.

In particular, it should be appreciated that the buoyant actuator in the various forms thereof described and illustrated herein need not be limited to use in apparatus 10 for harnessing ocean wave energy. The buoyant actuator may have application to various other arrangements.

Further, it should be appreciated that the pump 15 described and illustrated herein need not be limited to application in apparatus 10 for harnessing ocean wave energy. The pump, and associated provision for the control of the pump for dissipation of energy for damping purposes, may have application to various other arrangements.

Modifications and improvements may be made without departing from the scope of the invention.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The invention claimed is:

1. A buoyant apparatus comprising a hollow body presenting an exterior surface, the hollow body being adapted to be continuously located below a water surface during operation, a damping means associated with the hollow body for connecting the hollow body to a tether, the damping means providing a yieldingly resilient connection between the hollow body and the tether, the buoyant apparatus being operatively connectable to a separate pump by way of a coupling which includes the tether.

2. The buoyant apparatus according to claim 1 wherein the damping means is configured to maintain a substantially rigid connection between the body and the tether until such time as loading therebetween exceeds a prescribed load whereupon the damping means facilitates limited relative movement therebetween to relieve the loading.

3. The buoyant apparatus according to claim 1 wherein the damping means is accommodated within the hollow body.

4. The buoyant apparatus according to claim 1 wherein the damping means comprises a damping mechanism and an accumulator operably coupled to the damping mechanism through a resistance fluid.

5. The buoyant apparatus according to claim 4 wherein the damping mechanism comprises a body defining a cavity, a piston assembly accommodated within the cavity, the body and the piston assembly cooperating to define a working chamber in the cavity, the working chamber being of variable volume upon relative movement between the piston assembly and the body, wherein the accumulator is operably coupled to the working chamber through the resistance fluid.

6. The buoyant apparatus according to claim 4 wherein the accumulator provides a predetermined fluid pressure loading on the piston assembly within the working chamber to resist movement of the piston assembly until such time as the load on the piston exceeds said prescribed load whereupon the piston assembly undergoes movement in response to the loading thereon causing progressive contraction of the working chamber to act upon the resistance fluid which yieldingly resists such movement.

7. The buoyant apparatus according to claim 5 wherein the piston assembly divides the cavity into a working side and a blind side, the working side defining the working chamber.

8. The buoyant apparatus according to claim 7 wherein the blind side is closed.

9. The buoyant apparatus according to claim 7 wherein a communication path is provided between the working side and the blind side.

10. The buoyant apparatus according to claim 5 wherein the piston assembly comprises a piston head accommodated in the cavity and a piston rod extending from the cavity.

11. The buoyant apparatus according to claim 10 wherein the body comprises a cylinder barrel, and wherein the cylinder barrel is connected to the hollow body and the piston rod is adapted for connection to the tether.

12. The buoyant apparatus according to claim 4 wherein the accumulator is accommodated within the hollow body.

13. The buoyant apparatus according to claim 11 wherein the accumulator is accommodated within the hollow body and wherein the cylinder barrel is mounted for pivotal movement about an axis transverse to the longitudinal axis of the buoyant apparatus.

14. The buoyant apparatus according to claim 1 wherein the hollow body is configured to provide an upper section, a lower section, and a mid section between the upper and lower sections.

15. The buoyant apparatus according to claim 14 wherein the upper and lower sections are of truncated configuration.

16. The buoyant apparatus according to claim 14 wherein the upper section presents an uppermost surface and the lower section presents a lowermost surface.

17. The buoyant apparatus according to claim 14 wherein holes are provided in the hollow body to permit entry of water into the hollow interior thereof.

18. The buoyant apparatus according to claim 17 wherein the holes are provided in the midsection.

19. The buoyant apparatus according to claim 12 wherein the hollow body is configured as a truncated sphere.

20. The buoyant apparatus according to claim 12 wherein the hollow body is configured as a truncated oblate spheroid.

21. The buoyant apparatus according to claim 12 wherein the midsection of the hollow body is of cylindrical configuration.

22. The buoyant apparatus according to claim 12 wherein the midsection of the hollow body is of polygonal configuration.

23. The buoyant apparatus according to claim 1 wherein the hollow body is provided with one or more buoyancy chambers.

24. The buoyant apparatus according to claim 23 wherein the one or more buoyant chambers are accommodated within the hollow body.

25. The buoyant apparatus according to claim 1 further comprising provision for selectively varying the buoyancy of the hollow body.

26. The buoyant apparatus according to claim 25 wherein the selective variation of buoyancy comprises introduction of a buoyancy controlling fluid into the buoyancy chambers or removal of a buoyancy controlling fluid from the buoyancy chambers.

27. The buoyant apparatus according to claim 1 wherein the hollow body comprises an internal frame structure and a surrounding skin which provides the exterior surface.

28. The buoyant apparatus according to claim 27 wherein the cylinder barrel is centrally located within the internal frame structure.

29. The buoyant apparatus according claim 1 wherein the hollow body is configured such that the interior thereof is accessible both on land and in the water.

30. A wave energy conversion system comprising a buoyant apparatus comprising a hollow body presenting an exterior surface, the hollow body being adapted to be continuously located below a water surface during operation, one or more buoyancy chambers accommodated within the hollow body, and an opening means within the body permitting water to enter the hollow body, a pump operably connected to the buoyant apparatus to undergo a pumping action in response to wave motion, the pump being incorporated in a hydraulic circuit along which fluid is delivered by the pump, means associated with the hydraulic circuit for controlling characteristics of the fluid delivered by the pump, the pump having a first port and a second port, wherein the pump is configured to block communication between the second port and the working chamber as the working chamber approaches a minimum volume condition, whereby the rate at which the fluid can discharge from the contracting working chamber is restricted when the second port is blocked, thereby causing that portion of the fluid still remaining in the working chamber to be compressed at a far more rapid rate and so delivering far greater resistance to continued movement of the piston head.

31. The wave energy conversion system according to claim 30 wherein the hollow body comprises an upper section, a lower section, and a mid section between the upper and lower sections, the opening means comprising a plurality of apertures in the mid section.

32. The wave energy conversion system according to claim 30 wherein the characteristics of the fluid being controlled comprise the rate at which the fluid pressure increases during a delivery cycle of the pump, whereby control of the rate at which the fluid pressure increases during a delivery cycle of the pump provides a system for relieving excessive loadings on the wave energy conversion apparatus.

33. The wave energy conversion system according to claim 30 wherein the hydraulic circuit includes an accumulator for hydraulically resisting the delivery cycle of the pump.

34. The wave energy conversion system according to claim 33 wherein the accumulator is so configured that the rate of hydraulic resistance to the delivery cycle of the pump increases progressively during the delivery cycle.

35. The wave energy conversion system according to claim 30 whereby the pump comprises a reciprocating piston pump.

36. The wave energy conversion system according to claim 35 wherein the pump comprises a body defining a cavity, a piston assembly accommodated within the cavity, the body and the piston assembly cooperating to define a working chamber in the cavity, the working chamber being of variable volume upon relative movement between the piston assembly and the body, wherein the accumulator is operably coupled to the working chamber through the resistance fluid.

37. The wave energy conversion system according to claim 36 wherein the piston assembly divides the cavity into a working side and a blind side, the working side defining the working chamber.

38. The wave energy conversion system according to claim 36 wherein the piston assembly comprises a piston head accommodated in the cavity and a piston rod extending from the cavity.

39. The wave energy conversion system according to claim 36 wherein the body comprises a cylinder barrel.

40. The wave energy conversion system according to claim 39 wherein the cylinder barrel is connected to a mooring installed on the floor of a body of water, and the piston rod is adapted for connection to the tether.

41. The wave energy conversion system according claim 30 wherein the second port communicates with a fluid flow path.

42. The wave energy conversion system according to claim 36 wherein the cavity is configured to comprise a first cavity section of larger diameter and a second cavity section of smaller diameter, with a shoulder defined therebetween, the first cavity section accommodating the piston head and the second cavity section being incorporated in the working chamber.

43. The wave energy conversion system according to claim 42 wherein the second cavity section has a side wall onto which the second port opens and the shoulder defines an annular face which confronts the first cavity section and onto which the first port opens for communication with the first cavity section.

44. The wave energy conversion system according to claim 42 wherein the second cavity section is of a size which can accommodate the piston rod but not the piston head, the piston rod extends from the piston head, passing through the second cavity section.

45. The wave energy conversion system according to claim 42 wherein the piston rod incorporates an obscuring sleeve which is disposed adjacent the piston head and which is configured to enter the second cavity section as the working chamber approaches its minimum volume condition, whereby the sleeve upon entering the second cavity section cooperates with the side wall of the second cavity section and obscures the second port from the first cavity section.

* * * * *